E. E. THOMAS.
NUT LOCK.
APPLICATION FILED DEC. 21, 1918.

1,347,722.

Patented July 27, 1920.

INVENTOR,
Edwin E. Thomas,
By
Mack & Litzenberg
attorneys.

UNITED STATES PATENT OFFICE.

EDWIN E. THOMAS, OF PORTLAND, OREGON, ASSIGNOR TO THOMAS ENGINEERING WORKS, OF PORTLAND, OREGON.

NUT-LOCK.

1,347,722.  Specification of Letters Patent.  Patented July 27, 1920.

Application filed December 21, 1918. Serial No. 267,842.

*To all whom it may concern:*

Be it known that I, EDWIN E. THOMAS, a citizen of the United States, residing in the city of Portland, Multnomah county, and State of Oregon, have invented certain new and useful Improvements in Nut-Locks, of which the following is a specification.

The principal object of my invention is to provide means for locking the usual nut on a bolt, said means constituting an auxiliary or independent device which can be applied and locked to the bolt. I have illustrated my device on the accompanying sheet of drawings, in which—

Figure 3:
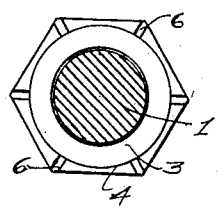
Fig. 3 is a sectional view taken on line 3, 3, of Fig. 1.
Figure 4:
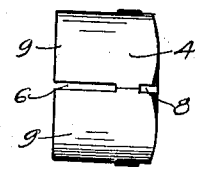
Fig. 4 is a side elevation of the nut locking element.
Figure 1:
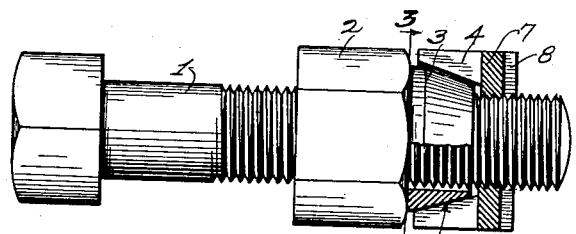
Figure 1 is a side elevation of a bolt and nut with my device applied thereto and shown in section.
Figure 2:
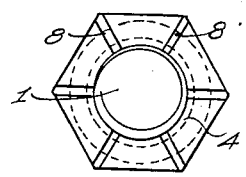
Fig. 2 is an end view thereof.

In the drawings, 1 designates a bolt and 2 a nut, which may be of any size and form. 3 designates a collar having an external conical surface and adapted to be placed over the end of the bolt. 4 is a nut-like element having a conical internal surface 5, slitted as at 6, 6. Said nut-like element 4 is threaded through its solid portion 7, and is also slitted as at 8, 8, in its outer end. The slits 6 and 8, it will be noted, are in alinement with each other, thus forming spaced stave-like sections 9, 9, the longer internally beveled ends of which are capable of certain expansion, whereby to force the upper ends thereof inwardly into locking engagement with the bolt 1.

It will thus be seen that the conical collar 3 can be quickly applied to the end of the bolt and the nut element 4 screwed on to the bolt 1 in such a way as to lock it securely to said bolt, thereby making it impossible for the regular nut 2 to work loose.

What I claim and desire to secure protection for is:

1. In combination with a bolt and nut, a conical collar adapted to be placed over said bolt against said nut and a slit nut-like element having an internal conical surface adapted to engage said collar, whereby to expand one part of said nut-like element and to contract another part thereof into locking engagement with said bolt.

2. In combination with a bolt and nut thereon, a collar having an external conical surface and adapted to be placed over said bolt against said nut, and a nut-like element having an internal conical surface with a plurality of slits therethrough, said nut-like element being threaded internally and also slitted in its outer end, whereby expansion of the inner ends of said nut-like element contracts the outer ends thereof into circumferential locking engagement with said bolt.

3. In combination with a bolt, a collar having an external conical surface, and a nut-like element formed of a series of stave-like sections connected intermediate their ends, and internally threaded at their connecting portion, the inner ends of said stave-like sections being of conical form, whereby as said nut-like element is screwed on to said bolt, the inner ends of said stave-like sections are expanded and their outer ends moved inwardly into circumferentially locked engagement with said bolt, substantially as shown and described.

Signed at Portland, Multnomah county, Oregon, this 15 day of August, 1918.

EDWIN E. THOMAS.

In presence of—
S. F. WILSON,
HAZEL M. BRUNS.